United States Patent [19]

O'Callaghan et al.

[11] 4,155,314

[45] May 22, 1979

[54] SUSPENSION MEDIUM

[75] Inventors: William P. O'Callaghan, Gerrards Cross, England; Gianfranco Mecatti, Bergamo, Italy

[73] Assignee: Hercules Powder Company Limited, England

[21] Appl. No.: 888,460

[22] Filed: Mar. 20, 1978

[30] Foreign Application Priority Data

Mar. 18, 1977 [GB] United Kingdom ............... 11578/77
Jan. 3, 1978 [GB] United Kingdom ............... 00045/78

[51] Int. Cl.² ........................... C08L 5/00; C09K 5/00
[52] U.S. Cl. ............................................. 111/1; 47/9; 106/208
[58] Field of Search .................. 106/205, 208; 111/1, 111/DIG. 1; 47/9

[56] References Cited

U.S. PATENT DOCUMENTS

| 3,482,353 | 12/1969 | Scheuermann et al. | 47/9 |
| 3,759,197 | 9/1973 | Bracke | 111/1 |
| 3,765,918 | 10/1973 | Jordan et al. | 106/208 |
| 3,894,879 | 7/1975 | Colegrove | 106/208 |
| 4,068,602 | 1/1978 | Mickus et al. | 111/DIG. 1 |

*Primary Examiner*—Theodore Morris
*Attorney, Agent, or Firm*—W. Stanley Alexander

[57] ABSTRACT

Stable suspensions of solid particles are formed by dispersing the particles in a pseudoplastic aqueous medium containing in solution xanthan gum and at least one non-ionic water-soluble polymer, exemplified by guar gum, in proportions providing an unexpectedy high ratio of yield point to plastic viscosity. The medium is especially useful in the planting of seeds which may be pre-germinated.

17 Claims, No Drawings

SUSPENSION MEDIUM

The present invention relates to compositions for suspending dispersed particulate solid matter, and to methods of forming stable suspensions of solid particulate matter. More particularly the invention relates to the use of an aqueous suspension medium containing certain branched polysaccharide gums in solution, for suspending solid particulate matter, and especially for suspending seeds for fluid drilling.

The capacity of a medium for suspending solid particulate matter is of commercial concern for many industries. Examples of such industries include agriculture, where seed distribution and fertiliser and animal feed distribution are important; the paper and paint industries utilising colour pigment and filler suspensions; the oil industry which utilises drilling muds and fracturing fluids; the mining industry where materials are transported as slurries; civil engineering where coatings are utilised, or a sealing medium is required, for instance in tunnelling operations; the foundry industry which uses mould and sand coatings; the cosmetic and pharmaceutical industries with products such as toothpaste; the printing, paper, textile and similar industries in which a great variety of treating agents are to be applied in suspension; the building industry for instance with gypsum board pastes; the food industry; and many others.

Among the methods now in use by these industries for the suspension of solid particulate matter in aqueous media is the use of water soluble strongly ionically charged chemicals which tend to adsorb onto the surfaces of the suspended particles rendering them mutually repellent, or the use of water soluble thickening agents which act by increasing the viscosity of the continuous phase, thus reducing the settling rate of the suspended solid particles. Combinations of these two methods are often used. Disadvantages in the use of these methods is that the former is liable to give a system which is unstable in the presence of other electrolytes, and the latter presents problems in the handling of high viscosity liquids. Many of the thickening agents in general use are sufficiently thixotropic to allow considerable settlement of the suspended particles before full recovery of the fluid to the limiting viscosity or shear stress.

Ideal requirements of a suspending medium for universal use in the industries mentioned above, are: a non-polar or only weakly ionic nature, chemical inertness, non-toxicity, ease of handling, ease of making-up in cold water, and ability to exhibit the phenomena of pseudoplasticity and yield stress sufficient to overcome the forces tending to settle a given suspended material. The suspensive power of such a medium is not intrinsically due to viscosity as such, but viscosity can enhance the suspensive power of the gel structure characteristic of such systems.

It is a general object of the invention to provide an improved and economically attractive suspending medium fulfilling the abovementioned requirements.

It is a preferred object of the invention to provide a suspending medium not only fulfilling the abovementioned requirements but also useful for suspending seeds, which may be germinated, prior to and during planting.

Nutrients, fungicides and other adjuvants could be included in such a suspending medium in intimate contact with the seeds. A high degree of pseudoplasticity of the medium is important to permit the seeds to be readily dispersed in the medium which is otherwise viscous, and to permit the resulting seed dispersion to be readily pumped with a low consumption of energy through fairly small orifices in planting. For use in the planting of germinated seeds, the suspending medium must also be biodegradable.

We have discovered that an aqueous medium containing xanthan gum and a non-ionic, water-soluble organic polymer, exhibits synergism in respect to yield stress of the medium.

According to the invention a method of forming a stable suspension of solid particles comprises dispersing the particles in a pseudoplastic aqueous medium containing in solution xanthan gum and at least one non-ionic water-soluble polymer.

Accordingly the present invention provides a suspension of dispersed solid particles in a pseudoplastic aqueous medium containing in solution xanthan gum and at least one non-ionic water-soluble polymer.

Xanthan gum is the dried product resulting from the fermentation of simple sugars with a member of the Xanthomonas family, preferably *Xanthomonas campestris* (NRRL - B 1459).

Examples of such water soluble polumers include non-ionic soluble starches, non-ionic cellulose ethers such as hydroxyethyl cellulose, galactomannans, and non-ionic synthetic polymers, e.g. polyacrylamides.

Xanthan gum solutions at suitable concentrations have the ability to suspend solid particles very effectively. This property is not primarily due to the viscosity of these solutions. Solutions of many polymers exhibiting must higher viscosity are not effective in suspending particles. The suspending power of these solutions of xanthan gum is believed to be due to the gelatinous texture which in molecular terms may involve a network structure. In rheological terms it may be said that the xanthan gum solutions have a definite yield stress.

A medium with the requisite pseudoplasticity and other rheological phenomena can be prepared by dissolving about 1 part of xanthan gum in 100 parts of water, but such solutions do not have the necessary degree of biodegradability when placed in or on the soil and hence would not be suitable for the seed planting application described above.

When solutions of blends of xanthan gum with for example guar gum are examined, it is found that there is a synergistic increase in viscosity and suspending power and moreover also in yield stress, even when the proportion of xanthan gum in the blend is relatively small.

Guar gum by itself exhibits little or no yield stress. It is often used as a suspending agent by virtue of its high solution viscosity, but such solutions are difficult to pump, pour or stir. However, we have found that aqueous solutions of guar gum with minor proportions of xanthan gum exhibit considerable yield stress, apparent in the elastic solid extant under low rates of shear; that the solutions behave as normal non-Newtonian fluids when the yield stress is exceeded by means such as stirring, pumping and pouring; and that the solutions exhibit little or no thixotropy. These solutions have a relatively low viscosity when the yield stress has been exceeded, i.e. they exhibit pseudoplasticity which allows them to be more readily stirred, pumped, poured or extruded than guar gum solutions alone which rely on high viscosity for their suspending action.

Thus solutions of 95 parts guar to 5 parts xanthan (by weight) in water have substantially as good suspending power as solutions of xanthan gum at the same total polymer/gum concentration. Similar behaviour is exhibited by blends of locust beam gum and xanthan gum; the synergistic yield stress, elasticity and viscosity effects are even greater with locust bean gum than with guar gum. In view of the fact that these natural gums are more abundant and less costly than xanthan gum, there is a significant economic advantage in using the blends in place of xanthan alone in solutions for suspending solid particles.

Two other galactomannans which may be used in place of guar gums or locust bean gum in blends with xanthan gum in this invention are tara and espina corona.

Solid particles which may be suspended in the media of the invention include for example not only seeds or germinated seeds, and soil treating agents, but also pigments and mineral fillers, polymeric materials, rock cuttings and so forth; the medium may be in the form of a drilling mud or fracturing fluid; a printing paste in which the colour is a pigment dispersion; a foodstuff, medicament, or hygiene or toilet preparation such as toothpaste; or a moulding or casting material for instance in civil engineering or foundry.

The invention further contemplates a method of sowing seeds which comprises dispersing seeds, especially germinated seeds in a biodegradable pseudoplastic aqueous medium containing in solution xanthan gum and at least one non-ionic, water-soluble polymer, preferably a galactomannan, to form a stable suspension of the seeds, and distributing said medium on the land in such a manner as to plant the seeds in or on the soil.

In another embodiment of this method the aqueous medium may contain a suspended fertiliser or other soil-treating substance. Such a composition may also contain biologically active ingredients such as fungicides, insecticides, bactericides, herbicides, nematocides or other pest control agents.

In preferred embodiments the proportions of the xanthan gum and the polymer are such that the suspending power of the medium is higher than that of a solution of either component alone at the same total gum/polymer concentration. This may permit the use of less total gum and polymer to achieve a desired suspension.

The suspending medium accordingly preferably comprises an aqueous solution of from 1 to 30 parts by weight of xanthan gum with from 99 to 70 parts by weight of polymer. In the case where the non-ionic polymer is guar gum the more preferably proportions are 3 to 10 parts by weight of xanthan gum, and 97 to 90 parts by weight of guar gum.

In the most preferred embodiments the proportion of polymer used with the xanthan gum is at least as high as that which will give the maximum suspending power in the resulting medium. In the case of guar gum as the polymer this proportion is about 92.5 parts of guar gum to 7.5 parts of xanthan gum.

The mixtures of xanthan gum and galactomannans may be dissolved for purposes of the invention in water at concentrations ranging from 0.05 percent by weight, preferably 0.3 percent, up to 10 percent by weight, preferably 1 percent, and yield solutions that embody the requirements of an ideal universal suspending medium.

These solutions exhibit little thixotropy. Moreover the solutions are non-toxic, chemically inert, easy to handle, soluble in cold water, and largely biodegradable in spite of the presence of xanthan gum which is reported to be resistant in this respect.

It is contemplated that the suspending medium of the invention can also be used to suspend encapsulated delicate objects since they will not only be held suspended but the elastic properties of the medium will protect the objects from the effects of external impact.

The application of the suspension medium of the present invention, to the suspension of pre-germinated seeds intended for fluid drilling of the seeds, is a particularly good illustration of its convenience and efficiency. Such use calls for a fluid with the ability to support various sizes and densities of seeds and yet to move easily through narrow bore tubing, and the properties should be maintained under field conditions, i.e. with various water supplies and in an environment permitting only limited facilities for control by the farmer.

The gum/polymer mixtures of the invention meet these requirements. In particular they can be pumped without incurring damage to the delicate suspended matter constituted by the germinated seeds. Moreover the mixtures do not form a hard skin but in the soil break down at a suitable rate to avoid damage to the seeds by local accumulation of their own toxic metabolic products. They also advantageously retain moisture.

Additives of various kinds may be incorporated in the suspensions as desired, for instance preservatives, seed growth agents, colouring and so forth.

The following general procedure may be used for germinating and planting the seeds. The seeds are suspended in a glass column about 1 meter high filled with water. The column has openings at the bottom for the addition of both air and water. The air is added as fine bubbles at such a rate as to keep the seeds suspended. Water is added at the bottom at a slow rate and overflows at the top. The column is exposed to light and kept at about 20° C. during the germination period. The germinated seeds are filtered off and added to a gently agitated 1 percent aqueous solution of e.g. guar-xanthan gum 92.5:7.5. Agitation is continued until the seeds are uniformly dispersed. When agitation is stopped, the seeds remain suspended for several days.

The suspension is poured or pumped into the reservoir of a planter. As the planter moves, the suspension is pumped by means of a peristaltic pump through a nozzle into the furrow. The pump is set in such a manner that substantially no damage is done to the seeds. A rate of extrusion of 20 to 100 ml. per meter of row has proved satisfactory.

The concentration of suspended seeds will be adjusted to give the desired spacing which will depend on the seeds.

The suspending power of the solutions of mixtures according to the invention may be utilised in suspending up to 90 percent by weight of solid matter in the solution, i.e. 90 parts of solid suspended matter to 10 parts of aqueous solution. This is illustrated in the following Examples.

EXAMPLE 1

100 Oil-seed rape seeds (non-germinated) of specific gravity approximately 1.10 were suspended in a solution consisting of 1 percent w/v guar/xanthan gum blend, such blend being made with 5 parts by weight xanthan gum and 95 parts by weight commercial guar gum. The solution had been preserved with pentachlorometaxylenol to prevent biodegradation of the components and to deactivate any enzymes present which may have caused degradation of the polysaccharides.

After 7 days the seeds had shown no sign of settlement whereas similar seed suspended in 1.0 percent guar gum solution had settled out completely after only one day. Settlement had also occurred with rape seeds in 1.0 percent solutions of other polysaccharides such as hydroxyethyl cellulose and sodium carboxy methyl cellulose.

EXAMPLE 2

A mixture of 2 parts xanthan gum to 98 parts guar was treated as in Example 1. The seeds remained in suspension for about 48 hours after which they were considered to show direct distinct signs of settlement.

EXAMPLE 3

About 3 grammes of sand with specific gravity approximately 2.8 were dispersed in 100 ml. of each of the above xanthan gum/guar systems, (Examples 2 and 3), and it was observed that the suspension in 5/95 blend was stable over 3 days whereas the sand rapidly settled out in solutions prepared from blends containing less than 5 parts xanthan gum per 100 parts total gum.

The following Example reports data illustrating the application of the suspension medium of the invention in association with liquid fertiliser material and particulate solid treatment agent for soil, i.e. a compound supplying lime.

EXAMPLE 4

A stock aqueous solution of 28 percent by weight urea was prepared along with dry blends of guar xanthan at a weight ratio of 95:5. The gums were dissolved in the urea solution and <200 mesh calcium carbonate was added at a rate of 10 g./50 ml. urea solution. These were set aside and checked for stability after about 72 hours.

| Sample | Gum | Concn. | Remarks |
|---|---|---|---|
| 1 | xanthan | 0.3% | Separation into packed bottom layer - cloudy supernatant layer |
| 2 | xanthan | 0.4% | Good suspension - small clear layer at top |
| 3 | xanthan/guar | 0.2% | Loosely packed bottom layer - cloudy supernatant and clear top layers |
| 4 | xanthan/guar | 0.4% | Good suspension - judged better than 2 above - slight hint of top clear layer. |

In further tests, one sample using xanthan/guar at 0.3 percent concentration proved satisfactory, while another showed slight settling at the top of the jar, i.e. not excessive for use within a few days.

The relationship between suspending power of guar/xanthan blends and rheological parameters which are readily measured with standard laboratory equipment, is illustrated by the data in the following Table, which also shows the synergistic effects on viscosity and yield points when the xanthan proportion of the gum blend is below 10 percent.

Yield point (YP) is the limiting stress in dynes sec $cm^{-2}$ calculated by extrapolation of the stress (Fann Reading)/shear rate (revolutions per minute) of the fluid, using the Fann viscometer as recommended in the Standard Procedure for Testing Drilling Fluids issued by the American Petroleum Institute of Dallas, Texas, U.S.A.

TABLE.

| Guar per cent | 100 | 98 | 95 | 92.5 | 90 | 80 | 70 | 60 | 50 | 40 | 20 | 0 |
|---|---|---|---|---|---|---|---|---|---|---|---|---|
| Xanthan per cent | 0 | 2 | 5 | 7.5 | 10 | 20 | 30 | 40 | 50 | 60 | 80 | 100 |
| Fann Readings (b) | | | | | | | | | | | | |
| 300 rpm | 131 | 137 | 137 | 141 | 131 | 126 | 120 | 107 | 102 | 87 | 73 | 64 |
| 600 rpm | 157 | 164 | 162 | 166 | 154 | 152 | 145 | 131 | 125 | 106 | 88 | 74 |
| Plastic viscosity | 26 | 27 | 25 | 25 | 23 | 26 | 25 | 24 | 23 | 19 | 15 | 10 |
| Yield point | 105 | 110 | 112 | 116 | 108 | 100 | 95 | 83 | 79 | 68 | 58 | 54 |
| YP/PV | 4.04 | 4.07 | 4.48 | 4.64 | 4.70 | 3.85 | 3.80 | 3.46 | 3.43 | 3,58 | 3.87 | 5.4 |
| Brookfield viscosity 20 rpm 25° C. (cps) | 3600 | 5300 | 6700 | | 6500 | 6150 | 5500 | 4500 | 4500 | 3700 | 3600 | 3400 |
| Contraves Rheomat viscosity (cps at 1.0 Sec.$^{-1}$ | 10500 | 60000 | 79000 | | 85000 | 70000 | 50000 | 40000 | | 10400 | 9000 | 7000 |
| Seed (c) suspension | E | C | A | | A | C | C | C | D | C | B | A |
| Sand (c) suspension | E | C | A | | A | C | D | D | D | C | B | A |

Notes with reference to the foregoing Table:
(a) Solutions (1 per cent) were prepared by adding the dry powders together to the water, stirring for 10 minutes and ageing for 24 hours before testing;
(b) Measured on a Fann V.G. viscometer with Spring 250;
(c)
A- remained suspended indefinitely;
B- remained suspended for several days;
C- remained suspended for 24 hours;
D- settled out overnight;
E- settled out in less than one hour.

It is well known from such laws as Stokes' Law that the movement of particles suspended in a fluid medium is governed by the viscosity of that fluid, so that in the long term suspension of given particles in a given suspending fluid, a low value of velocity of the particles through the liquid is obtained when viscosity is greatest.

Viscosity is the resistance to movement exhibited by the fluid. If the fluid requires a finite amount of force to be applied before any movement occurs it is said to possess a yield stress. This phenomenon is difficult to measure directly with existing instruments but may be inferred from observation of the movement of relatively dense particles through the fluid; if the particles remain stationary it is inferred that the cohesive forces within the fluid are greater than the force of gravity which would otherwise lead to settlement or sedimentation.

Alternatively it is possible to obtain data using the Fann viscometer procedure referred to in connection with the Table and, by extrapolation of the dial reading/r.p.m. curve, obtain a "dial reading" value for zero r.p.m. This is expressed as the yeild point (YP). Whilst the yield point is not an accurate measurement of the yield stress (since the yield point is deduced on the assumption that the dial reading/r.p.m. relationship is linear), experience with suspensions such as oil well drilling muds indicates increasing suspending power with increasing yield point.

The "plastic viscosity" is a measure of the increase in resistance as the speed of the instrument is increased; in the case of the foregoing Table, from 300 to 600 r.p.m. If the plastic viscosity is low, the fluid will show little increase in flow resistance with increasing speed (or shear rate).

In the present invention it is an object to provide a suspending medium which will maintain relatively dense particles in suspension for long periods of time but which can also be readily moved by the operations of stirring, pumping or pouring. The medium may also need to be able to flow readily through a narrow gap such as the nip of a roller or the blade of a doctor-blade, should it be used in one of the many coating operations in various industries. Such a fluid should also be capable of remaining in the bowl of a screen printing machine yet readily flow through the screen when forced through.

The foregoing indicates that the optimum fluid will be one with a high yield point and low plastic viscosity. It is well known that 1 percent aqueous solutions of xanthan gum will provide the desired properties. In order to better relate the yield point and plastic viscosity, the ratio YP/PV shown in the Table has been calculated from the results of the measurements made by a Fann viscometer on the series of 1 percent solutions prepared from a range of blends of xanthan gum and guar gum in the proportions indicated in the Table.

For the purposes of the present invention it is desirable that the ratio YP/PV be high. The greatest values for the ratio are obtained with blend ratios of guar gum to xanthan gum of from 98/2 to 80/20, and with xanthan gum on its own.

Direct observation of the suspending power of each blend solution in the series is reported at the bottom of the Table; blends of guar gum and xanthan gum with ratios between 95/5 and 90/10 gave almost limitless suspension time, similar to a solution of xanthan gum alone.

There is accordingly a close relationship between the instrumental data and the observed suspending power. The marked increase in the YP/PV ratio around the 92.5/7.5 guar/xanthan blend point is surprising. Just as surprising is the low value for the YP/PV ratio and the suspending power when the blend composition is in the region of 50/50 guar/xanthan.

Viscosity data obtained with two well-known and widely used methods (Brookfield Synchro-Lectric and Contraves Rheomat) have been included in the Table to show that some degree of viscosity synergism occurs when the blend ratio is in the region between 95/5 and 90/10 but that the remarkably good and well-known suspending power of xanthan gum itself would not have been predicted from the data presented.

What is claimed is:

1. A method of forming a stable suspension of seeds, which comprises dispersing the seeds in a pseudoplastic aqueous medium containing in solution xanthan gum and at least one non-ionic water-soluble polymer.

2. A method according to claim 1, wherein the ratio by weight of non-ionic water-soluble polymer to xanthan gum is in the range from 99:1 to 70:30.

3. A method according to claim 1, wherein the non-ionic water-soluble polymer is guar gum.

4. A method according to claim 3, wherein the ratio by weight of guar gum to xanthan gum is from 97:3 to 90:10.

5. A method according to claim 4, wherein the ratio by weight of guar gum to xanthan gum is about 92.5 parts guar gum to 7.5 parts xanthan gum.

6. A method according to any of claims 1 to 5, wherein the total concentration of gum and polymer in the water is from 0.05 to 10 percent by weight.

7. A method according to any of claims 1 to 5, wherein the total concentration of gum and polymer in the water is from 0.3 to 1 percent by weight.

8. A suspension of dispersed seeds in a pseudoplastic aqueous medium containing in solution xanthan gum and at least one non-ionic water-soluble polymer.

9. A suspension to claim 8, wherein the ratio by weight of non-ionic water-soluble polymer to xanthan gum is in the range from 99:1 to 70:30.

10. A suspension according to claim 8 wherein the non-ionic water-soluble polymer is guar gum.

11. A suspension according to claim 10, wherein the ratio by weight of guar gum to xanthan gum is from 97:3 to 90:10.

12. A suspension according to claim 11, wherein the ratio by weight of guar gum to xanthan gum is about 92.5 parts guar gum to 7.5 parts xanthan gum.

13. A suspension according to any of claims 9 to 12, wherein the total concentration of gum and polymer in the water is from 0.05 to 10 percent by weight.

14. A suspension according to any of claims 9 to 12, wherein the total concentration of gum and polymer in the water is from 0.3 to 1 percent by weight.

15. A method of sowing seeds which comprises dispersing seeds in a biodegradable pseudoplastic aqueous medium containing in solution xanthan gum at least one non-ionic, water-soluble polymer to form a stable suspension of the seeds, and distributing said medium on the land in such a manner as to plant the seeds in or on the soil.

16. A method according to claim 15 wherein said polymer is guar gum in a ratio of 90 to 97 parts by weight of guar gum to 10 to 3 parts by weight of xanthan gum.

17. A method according to claim 16 wherein said seeds are germinated seeds.

* * * * *